United States Patent
Rousseau et al.

[11] Patent Number: 6,131,413
[45] Date of Patent: Oct. 17, 2000

[54] METHOD OF CONTROLLING THE ETCHING AND COLLAPSE OF AN MCVD TUBE BY MONITORING INTERNAL PRESSURE

[75] Inventors: Jean-Claude Rousseau, Chatou; Raphaelle Sauvageon, Thones, both of France

[73] Assignee: Alcatel, Paris, France

[21] Appl. No.: 09/273,558

[22] Filed: Mar. 22, 1999

[30] Foreign Application Priority Data

Mar. 30, 1998 [FR] France ................................ 98 03896

[51] Int. Cl.[7] .......................... C03B 37/018; C03B 37/07
[52] U.S. Cl. ................ 65/377; 65/379; 65/419; 65/429
[58] Field of Search ............... 65/429, 379, 417, 65/419, 489, 377

[56] References Cited

U.S. PATENT DOCUMENTS 4,199,335  4/1980  Gliemeroth .
4,793,843  12/1988  Pluijms ..................................... 65/429

FOREIGN PATENT DOCUMENTS 0 754 655 A1  1/1997  European Pat. Off. .
0 117 009 A1  8/1984  Germany .
3527017 A1  2/1986  Germany .

*Primary Examiner*—John Hoffmann
*Attorney, Agent, or Firm*—Sughrue, Mion, Zinn, Macpeak & Seas, PLLC

[57] ABSTRACT

In a method of shrinking a tubular optical fiber preform with a doped silica core the preform is placed on a glassmaking lathe to rotate it about an axis, a torch is moved parallel to the axis in front of the preform to shrink it and collapse it in a number of passes, and during an etching pass a mixture of oxygen and a fluorine precursor gas is injected through one end of the incompletely collapsed preform to eliminate a certain layer from the core. During the etching pass, a certain value of the pressure of the gaseous mixture at the end of the preform is determined and the speed of the torch is slaved to this pressure value. Controlling the speed of the torch stabilizes the pressure of the gaseous mixture inside the preform, which longitudinally homogenizes the diameter of the core and the refractive index difference relative to an optical cladding around the core.

6 Claims, 2 Drawing Sheets

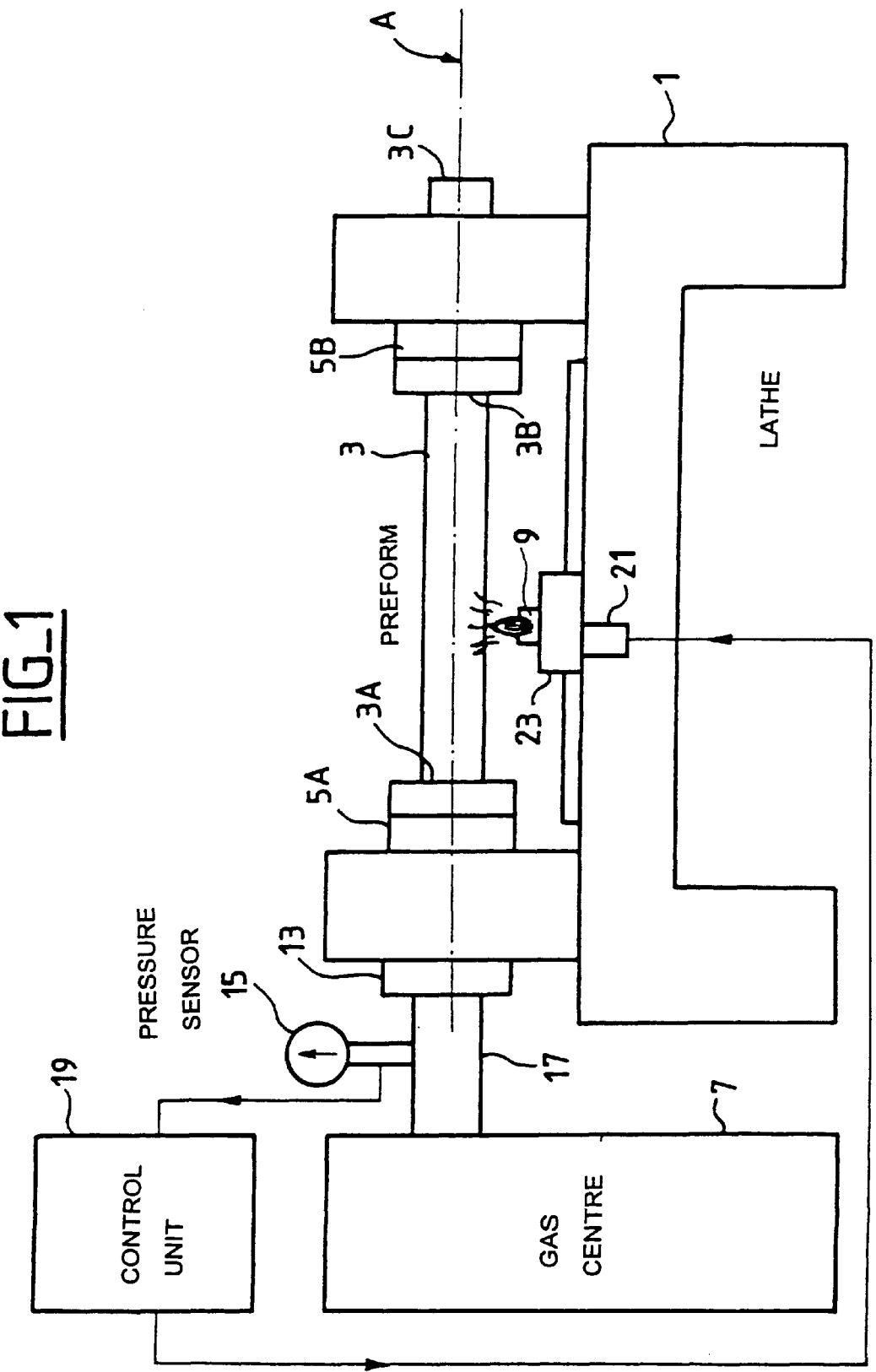

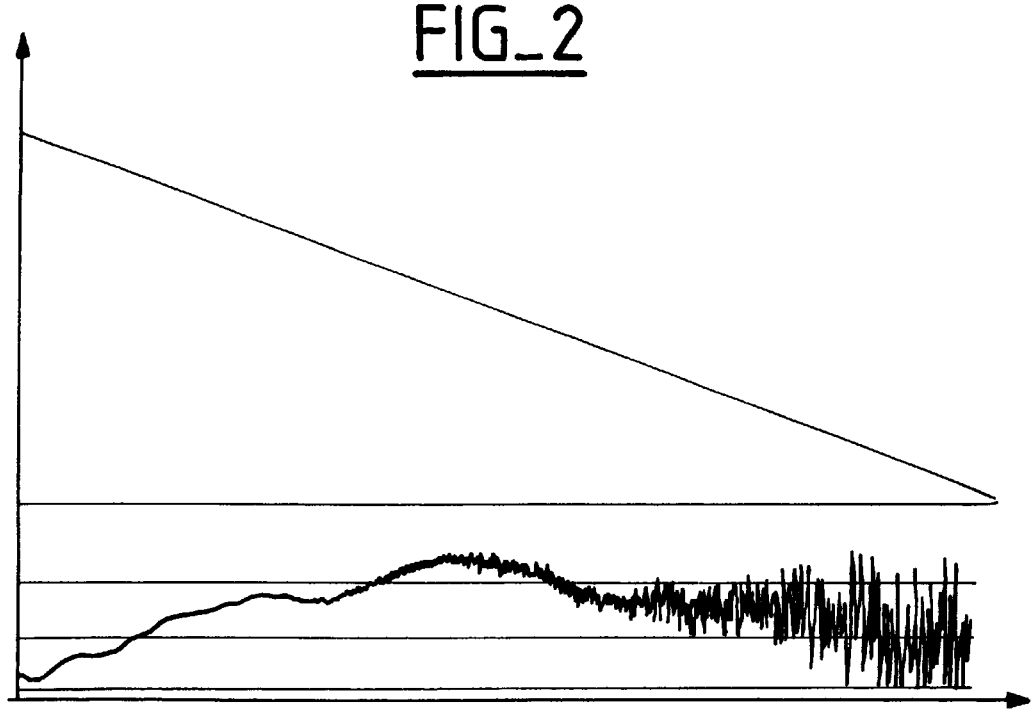
FIG_2
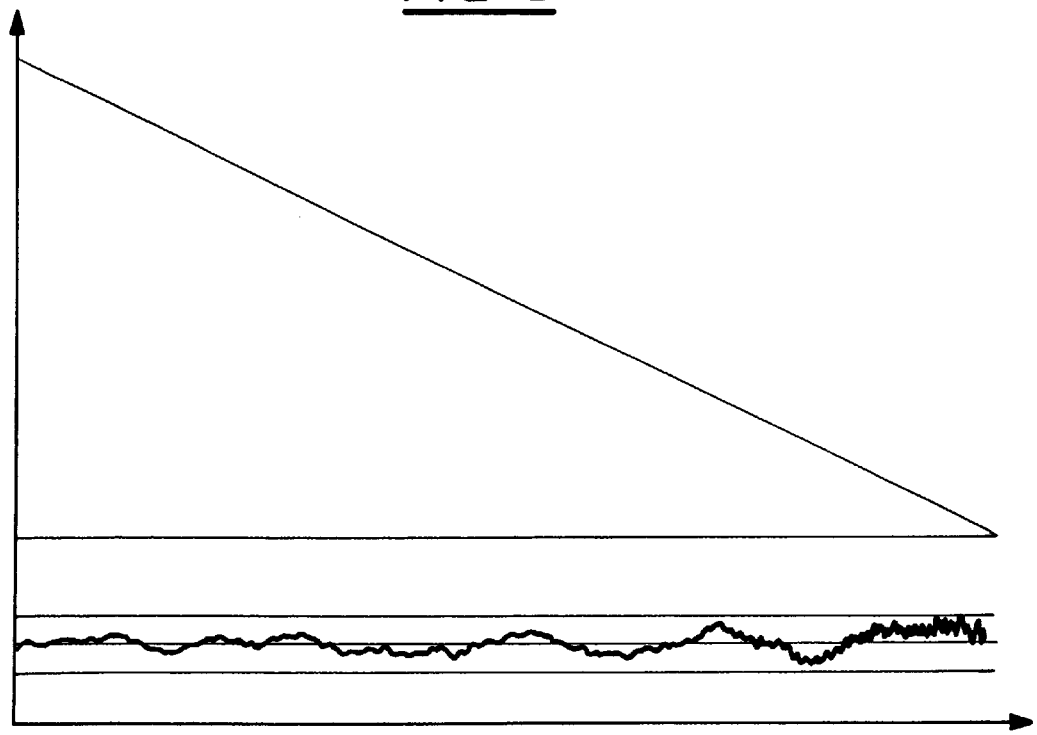
FIG_3

METHOD OF CONTROLLING THE ETCHING AND COLLAPSE OF AN MCVD TUBE BY MONITORING INTERNAL PRESSURE

FIELD OF THE INVENTION

The invention concerns a method of shrinking a tubular optical fiber preform with a doped silica core in which the preform is placed on a glassmaking lathe to rotate it about an axis, a torch is moved parallel to the axis in front of the preform to shrink it and collapse it in a number of passes, and during an etching pass a mixture of oxygen and a fluorine precursor gas is injected through one end of the incompletely collapsed preform to eliminate a certain layer from the core.

DESCRIPTION OF THE PRIOR ART

In the prior art the preform is made from a silica tube onto the interior of which layers of undoped silica are deposited from the vapor phase to form an optical cladding, followed by layers of doped silica, for example silica doped with germanium, to form the core. The thickness of the doped silica layers and the quantity of the doping element determine the diameter of the core and the difference in refractive index relative to the optical cladding.

The shrinking operation consists in progressively reducing the diameter of the preform until the tube collapses to form a solid rod. The torch is moved in front of the preform in several passes while the preform is rotating on its axis to soften the silica and shrink the tube, the preform retaining its circular shape.

Shrinking the tubular preform until it is collapsed is inevitably accompanied by impoverishment of the innermost germanium layer of the core, sine the germanium evaporates because of the high temperature inside the preform heated by the torch. This core layer underdoped with germanium is also polluted by impurities introduced during the vapor phase deposition process. This reduces the difference in refractive index relative to the optical cladding, which affects the properties of propagation of light in the optical fiber drawn from the preform.

Chemical etching is used to eliminate the core layer underdoped with germanium, as described for example in the article "MCVD Preform Central Dip Reduction by Collapse Under Fluorinated Atmosphere" published in 1982 by the "Journal of Non Crystalline Solids, 47(2)". The fluorine precursor gas, for example carbon tetrafluoride $CF_4$, sulfur hexafluoride $SF_6$ or dichlorofluoromethane $CF_2Cl_2$, is injected into the incompletely collapsed preform and decomposes in the presence of the silica and due to the effect of the temperature, releasing gaseous silicon tetrafluoride $SiF_4$. The decomposition reaction is described in particular in the article "Fluorine Doping and Etching Reactions of Freon 12 in Optical Fibre Manufacture" published in 1986 by the "Journal of Lightwave Technology, Vol. 4, No. 7". Eliminated the etching pass restores the refractive index profile obtained after depositing the cladding and core layers of the preform.

Cartographic analysis of the preform shrunk by the method previously described shows variations in the diameter of the core along the axial direction of the preform and variations in the refractive index difference relative to the optical cladding, which is interpreted as deterioration of the longitudinal homogeneity of the preform due to the chemical etching.

The aim of the invention is to alleviate this drawback by guaranteeing a core diameter and a refractive index difference relative to the optical cladding that are substantially constant in the longitudinal direction of the preform.

SUMMARY OF THE INVENTION

To this end, the invention consists in a method of shrinking a tubular optical fiber preform with a doped silica core in which the preform is placed on a glassmaking lathe to rotate it about an axis, a torch is moved parallel to the axis in front of the preform to shrink it and collapse it in a number of passes, and during an etching pass a mixture of oxygen and a fluorine precursor gas is injected through one end of the incompletely collapsed preform to eliminate a certain layer from the core, wherein, during the etching pass, a certain value of the pressure of said gaseous mixture at said end of said preform is determined and the speed of said torch is slaved to said pressure value.

Controlling the speed of the torch stabilizes the pressure of the gas mixture inside the preform. After the collapsing pass the preform is drawn to yield an optical fiber the propagation properties of which are tested using a backscattering method. In contrast to an optical fiber drawn from a preform shrunk without such control, there is seen in the longitudinal direction of the fiber a reduction in the variation in luminous power reflected about an average reflected power, which reflects a reduction in the variation in core diameter and a reduction in the variation in refractive index difference relative to the optical cladding.

The invention also consists in a method of shrinking a tubular optical fiber preform with a doped silica core in which the preform is placed on a glassmaking lathe to rotate it about an axis, a torch is moved parallel to the axis in front of the preform to shrink it and collapse it in a number of passes, and during an etching pass a mixture of oxygen and a fluorine precursor gas is injected through one end of the incompletely collapsed preform to eliminate a certain layer from the core, wherein, during the etching pass, a certain value of the pressure of said gaseous mixture at said end of said preform is determined and the injection flowrate of the gaseous mixture is slaved to said pressure value.

Controlling the injection flowrate also stabilizes the pressure of the gaseous mixture inside the preform.

In accordance with a first advantageous feature of the invention, speed or flowrate control is linear relative to the pressure value.

In accordance with a second advantageous feature of the invention, speed or flowrate control is linear relative to a variation in the pressure value.

In accordance with a third advantageous feature of the invention, the pressure value is determined in accordance with the thickness of the layer underdoped with germanium which must be eliminated during the etching pass.

In accordance with a fourth advantageous feature of the invention, the method applies to any type of refractive index profile: triangular, trapezium-shaped, Gaussian curve-shaped or step-shaped.

Other features and advantages of the invention will become apparent when reading the description of one embodiment of the invention illustrated by the drawings.

BRIEF DESCRIPTION OF THE DRAWINGS

FIG. 1 is a diagrammatic representation of a device for implementing a method in accordance with the invention.

FIG. 2 shows a backscattering curve obtained from an optical fiber drawn from a preform shrunk without control.

FIG. 3 shows a backscattering curve obtained from an optical fiber drawn from a preform shrunk with control in accordance with the invention.

DETAILED DESCRIPTION OF THE PREFERRED EMBODIMENT

A method of shrinking an optical fiber preform is implemented by a device (FIG. 1) which comprises a glassmaking lathe 1 which rotates the preform 3 about an axis A in two chucks 5A and 5B.

The preform is made from a silica tube using the MCVD process. A gas center 7 injects oxygen $O_2$ into the interior of the silica tube. The oxygen is charged with vapors of substances such as silicon tetrachloride $SiCl_4$ and germanium tetrachloride $GeCl_4$. A torch 9 heats the silica tube as it moves in translation parallel to the axis A in the same direction as the flow of gases and which, in FIG. 1, runs from the end 3A clamped in the chuck 5A to the end 3B clamped in the chuck 5B. When it approaches the end 3B the torch 9 is returned quickly to its point of departure to begin a new pass.

The gas center 7 communicates with the preform 3 via a rotary seal 13 at end 3A.

The torch 9 supplies thermal energy needed to deposit the gases on the inside of the glass tube. In the heated area nearest the torch 9, the gases react by forming particles that are then deposited onto the inside wall of the silica tube 3 downstream of the torch 9 in the gas flow direction. The particles deposited are vitrified by the torch 9 as it moves along the silica tube 3.

At the end of the deposition process the preform 3 comprises a cladding formed of the first layers deposited and a core formed of the last layers deposited. The gas center 7 is then vented or purged of the halogenated products $SiCl_4$ and $GeCl_4$.

The operation of shrinking the preform 3 begins, and during this operation the torch 9 raises the temperature of the preform to soften the silica and to bring about shrinkage. The torch is moved parallel to the axis A in a number of passes to collapse the preform to form a solid rod. A final pass polishes the lateral surface of the preform, which can receive a surface treatment, if appropriate.

As previously mentioned, during the shrinkage passes the germanium contained in the core tends to evaporate from the layer forming the inside wall of the preform. Chemical etching is used to eliminate this underdoped layer while the preform is still incompletely collapsed. A mixture of oxygen and of a fluorine precursor gas is injected into the interior of the preform 3 from the end 3A via the rotary seal 13. The gas center 7 supplies the oxygen and the fluorine precursor gas, for example carbon tetrafluoride $CF_4$, sulfur hexafluoride $SF_6$ or $C_2F_6$.

As when depositing the optical cladding and the core, the gas flows from the injection end 3A to the opposite end 3B which is vented to atmosphere at 3C.

In accordance with the invention, during the etching pass, a certain value of the pressure of the gaseous mixture at the end of the preform where it is injected is determined and the speed of the torch is slaved to said pressure value.

FIG. 1 shows a pressure sensor 15 which communicates with a gas inlet 17 at the injection 3A of the preform 3. The instantaneous pressure signal delivered by the sensor 15 is sent to a control unit 19 which processes it in accordance with a preprogrammed law to convert it into a control signal for an electric motor 21 mounted on a carriage 23 for moving the torch 9. In this way any variation in the pressure value determined at the end at which the gaseous mixture is injected into the interior of the preform 3 is converted by the control unit 19 into a variation in the speed of the torch 9.

A linear control law as a function of the pressure value determined by the sensor can be used. An increase in the pressure leads to an increase in the speed of the torch. A linear law as a function of the time derivative of the pressure value can equally be used, which enables the variations to be anticipated and consequently the speed of the torch to be controlled with a shorter response time.

In a different embodiment of the invention, during the chemical etching phase the flowrate with which the gaseous mixture is injected into the interior of the preform is controlled in accordance with the pressure value. The signal delivered by the pressure sensor is sent to the control unit where it is processed and converted into a control signal for a pump in the gas center metering the feed of oxygen and the fluorine precursor gas into the feed conduit.

Controlling the speed of the torch stabilizes the pressure inside the preform during the chemical etching pass. The control unit is programmed with a linear law which reduces the injection flowrate if the pressure sensor detects an increase in pressure.

FIGS. 2 and 3 show backscattering curves obtained with an optical fiber drawn from a preform shrunk without control (FIG. 2) and with linear control of the torch speed in accordance with the pressure value (FIG. 3).

Each figure shows the evolution of the backscattering of the optical fiber as a function of the same length in kilometers (km). The ordinate axis plots in decibels (dB) the reflected luminous power divided by the luminous power emitted at a wavelength of 1550 nanometers (nm). The upper curve in each figure shows an average variation and the bottom curve shows local variation in backscattering relative to the average.

Comparing the two figures shows a reduction in local variation in backscattering of the optical fiber drawn from the preform shrunk in accordance with the invention. In FIG. 3 the amplitude of local variations is limited to plus or minus 0.05 dB. The local variation shown in FIG. 2 is greater than this value. Other experimental results that have been obtained in accordance with the invention shown local variation in backscattered luminous power less than 0.05 dB absolute.

A method in accordance with the invention yields a preform that has a core diameter and a refractive index difference relative to the optical cladding that are substantially constant in the longitudinal direction. This longitudinal homogeneity confer on an optical fiber drawn from the preform a mode field, cut-off wavelength and climatic dispersion cancellation wavelength that are homogeneous along the axis of the fiber.

The invention advantageously applies to a preform having any type of refractive index profile: triangular, trapezium-shaped, Gaussian curved-shaped or step-shaped.

What is claimed is:

1. A method of shrinking a tubular optical fiber preform with a doped silica core in which the preform is placed on a glassmaking lathe to rotate it about an axis, a torch is moved parallel to the axis in front of the preform to shrink it and collapse it in a number of passes, and during an etching pass a mixture of oxygen and a fluorine precursor gas is injected through one end of the incompletely collapsed preform to eliminate a certain layer from the core, wherein, during said etching pass, a certain value of the pressure of said gaseous mixture at said end of said preform is determined and the speed of said torch is slaved to said pressure value.

2. The method claimed in claim 1 wherein said speed is a linear function of said pressure value.

3. The method claimed in claim 1 wherein said speed is a linear function of a variation in said pressure value.

4. A method of shrinking a tubular optical fiber preform with a doped silica core in which the preform is placed on a glassmaking lathe to rotate it about an axis, a torch is moved parallel to the axis in front of the preform to shrink it and collapse it in a number of passes, and during an etching pass a mixture of oxygen and a fluorine precursor gas is injected through one end of the incompletely collapsed preform to eliminate a certain layer from the core, wherein, during said etching pass, a certain value of the pressure of said gaseous mixture at said end of said preform is determined and the injection flowrate of the gaseous mixture is slaved to said pressure value.

5. The method claimed in claim 4 wherein said flowrate is a linear function of said pressure value.

6. The method claimed in claim 4 wherein said flowrate is a linear function of a variation in said pressure value.

* * * * *